No. 886,859. PATENTED MAY 5, 1908.
J. C. PYERS.
INK WELL.
APPLICATION FILED JAN. 18, 1907. RENEWED OCT. 30, 1907.
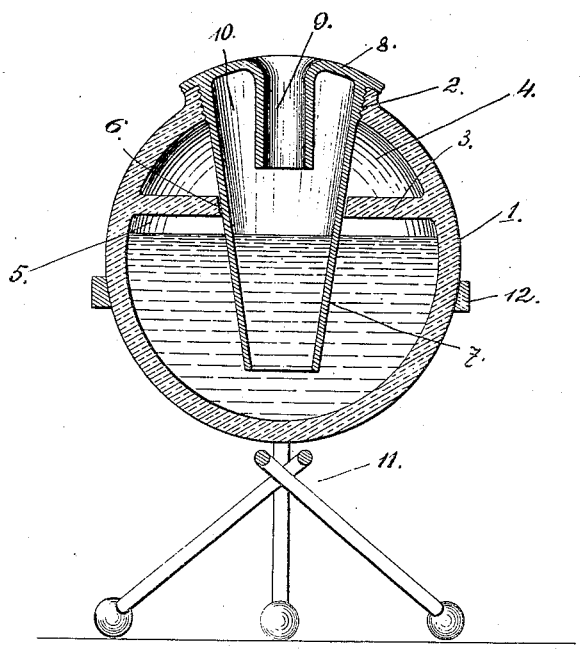
WITNESSES:
A. H. Ratsug,
R. H. Butler
INVENTOR
Joseph C. Pyers.
BY H. C. Everts Co.
Attorneys

UNITED STATES PATENT OFFICE.

JOSEPH C. PYERS, OF CARNEGIE, PENNSYLVANIA.

INK-WELL.

No. 886,859.      Specification of Letters Patent.      Patented May 5, 1908.

Application filed January 18, 1907, Serial No. 352,902. Renewed October 30, 1907. Serial No. 399,788.

*To all whom it may concern:*

Be it known that I, JOSEPH C. PYERS, a citizen of the United States of America, residing at Carnegie, in the county of Allegheny and State of Pennsylvania, have invented certain new and useful Improvements in Ink-Wells, of which the following is a specification, reference being had therein to the accompanying drawing.

This invention relates to ink wells, and the invention has for its object to provide a simple and inexpensive well wherein novel means is employed for preventing the contents of the well from being spilled when the well is accidentally upset or tilted.

Briefly described, my improved well comprises a spherical receptacle having a horizontal partition intersected by a depending detachable funnel. The funnel is constructed to deflect the contents of the well when the same is upset or tilted, while the contents of the funnel is retained therein when the well has been inverted.

In connection with the well, I use a suitable stand, as a tripod, and the well in its entirety is constructed to present a neat and attractive appearance.

The detail construction of my improved well will be hereinafter more fully described.

Referring to the drawing forming part of this specification, I have illustrated a vertical sectional view of my improved ink well.

The well comprises a spherical body portion 1 having a threaded opening 2. In the well is formed a horizontal partition 3 forming two compartments 4 and 5, the compartment 5 being larger than the compartment 4 and adapted to contain the contents of the well. The partition 3 is provided with a central opening 6 to receive a depending funnel 7 detachably mounted in the threaded opening 2 of the well. The funnel 7 extends within close proximity to the bottom of the receptacle 1 while its top is partially closed, as at 8 and provided with a depending tube 9.

The tube 9 forms an annular compartment 10 within the funnel 7, and the object of this compartment will presently appear.

The spherical receptacle 1 is supported by a suitable stand, as a tripod 11, which may be secured to the receptacle 1 or to a band 12 surrounding the receptacle 1.

Should the ink well be accidentally upset or tilted the writing fluid or contents of the well will be retained therein by the depending end of the funnel 7, while the writing fluid that may remain within the funnel is held within the compartment 10. It will thus be seen that it is impossible to spill the contents of the ink well when the same is tilted or accidentally upset.

In providing the detachable funnel 7, I have provided means whereby easy access may be had to the interior of the ink well for cleansing purposes.

The ink well is preferably constructed of vitreous material, but it is obvious that any other suitable material may be readily used.

Such changes in the size, and minor details of construction as are permissible by the appended claims, may be resorted to without departing from the scope of the invention.

What I claim and desire to secure by Letters Patent, is:—

In an ink well, a spherical hollow body having an opening in the top, and a suitable support for said body, a partition in said body located above the central line thereof and having a central opening, a dip funnel threaded into the opening of said spherical body, and extending through the central opening of said partition, having its upper end partially closed, and provided with an integral central depending tube.

In testimony whereof I affix my signature in the presence of two witnesses.

JOSEPH C. PYERS.

Witnesses:
   C. KLOSTERMANN,
   MAX H. SROLOVITZ.